United States Patent
Piersol et al.

(10) Patent No.: US 7,729,600 B2
(45) Date of Patent: Jun. 1, 2010

(54) TILT-SENSITIVE CAMERA PROJECTED VIEWFINDER

(75) Inventors: Kurt W. Piersol, Campbell, CA (US); Peter E. Hart, Menlo Park, CA (US); Sergey Chemishkian, Cupertino, CA (US)

(73) Assignee: Ricoh Co. Ltd., Tokyo (JP)

( * ) Notice: Subject to any disclaimer, the term of this patent is extended or adjusted under 35 U.S.C. 154(b) by 425 days.

(21) Appl. No.: 11/688,217

(22) Filed: Mar. 19, 2007

(65) Prior Publication Data

US 2008/0232788 A1   Sep. 25, 2008

(51) Int. Cl.
*G03B 17/00* (2006.01)
*G03B 13/02* (2006.01)
*G03B 17/48* (2006.01)

(52) U.S. Cl. .................. 396/50; 396/373; 396/431

(58) Field of Classification Search .............. 396/50, 396/373, 431
See application file for complete search history.

(56) References Cited

U.S. PATENT DOCUMENTS

| | | | | |
|---|---|---|---|---|
| 5,543,889 A | * | 8/1996 | McIntyre | 396/431 |
| 5,546,156 A | * | 8/1996 | McIntyre | 396/431 |
| 5,694,632 A | * | 12/1997 | Capper | 396/431 |
| 6,463,220 B1 | * | 10/2002 | Dance et al. | 396/431 |
| 6,516,151 B2 | | 2/2003 | Pilu | |
| 6,940,664 B1 | | 9/2005 | Pilu | |
| 2001/0019664 A1 | * | 9/2001 | Pilu | 396/431 |
| 2001/0041073 A1 | * | 11/2001 | Sorek et al. | 396/431 |
| 2008/0112700 A1 | * | 5/2008 | Foxenland et al. | 396/148 |

* cited by examiner

*Primary Examiner*—Rodney E Fuller
(74) *Attorney, Agent, or Firm*—Fenwick & West LLP

(57) ABSTRACT

A tilt-sensitive viewfinder indicates the area of an object plane within view of the camera using a visible signal projected from the camera. A direction sensor determines the camera orientation and modifies the visible signal as the camera orientation changes. Changes in appearance of the visible signal reflect changes in the camera field of view. Data from the direction sensor describing camera orientation may be stored in a data storage device and may be associated with data describing the captured image. The stored camera orientation data improves processing of captured images by providing information about angular components of the captured images.

12 Claims, 7 Drawing Sheets

TILT-SENSITIVE CAMERA PROJECTED VIEWFINDER

BACKGROUND OF THE INVENTION

1. Field of Art

The present invention generally relates to the field of image capture devices, and more specifically, to a camera with a tilt-sensitive projected viewfinder.

2. Description of the Related Art

Recent technological advancements have created smaller and cheaper camera designs. This has resulted in cameras being embedded in devices such as cell phones, personal digital assistants and tablet computers. However, existing camera designs use optical or electronic viewfinders to indicate the area of the target within view of the camera.

Existing optical or electronic viewfinders outline the area within view of the camera as the relative orientation of the camera and the area to be photographed change. Some current viewfinders also adjust the contents of the viewfinder as the focal length of the camera changes because of changes in the camera zoom setting. However, using optical or electronic viewfinders places a lower limit on camera size by requiring the camera to remain large enough to house the viewfinder.

Thus, from the above, there is a need for an alternative viewfinder design capable of indicating the area to be photographed. This alternative viewfinder may also illustrate changes in the area within view of the camera as the camera orientation relative to the area to be photographed changes or changes in the focal length of the camera.

SUMMARY OF THE INVENTION

The present invention overcomes the deficiencies and limitations of the prior art by providing a tilt-sensitive camera projected viewfinder and a method of operation. In one embodiment, the camera comprises an image capture device, a direction sensor that determines the orientation of the camera, and a projector adapted to communicate with the direction sensor and to project a visible signal onto the object plane of the camera. The visible signal produced by the projector is modified in response to changes in the orientation of the camera and indicates the field of view of the image capture device. In one embodiment, the camera also comprises a storage module to store data describing camera orientation and data describing the field of view of the image capture device. In another embodiment, the data describing the orientation of the camera is associated with the image data captured by the image capture device, which improves later processing of the image data. The present invention also includes a novel method for capturing an image with a tilt-sensitive camera viewfinder.

The features and advantages described in the specification are not all inclusive, and in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The invention is illustrated by way of example, and not by way of limitation in the figures of the accompanying drawings in which like reference numerals are used to refer to similar elements.

DETAILED DESCRIPTION OF EMBODIMENTS

A tilt-sensitive camera projected viewfinder and a method for using same are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

Moreover, the present invention claimed below may operate on or work in conjunction with an information system or network. Thus, the present invention is capable of operating with any information system from those with minimal functionality to those providing all the functionality disclosed herein.

Figure 1A:
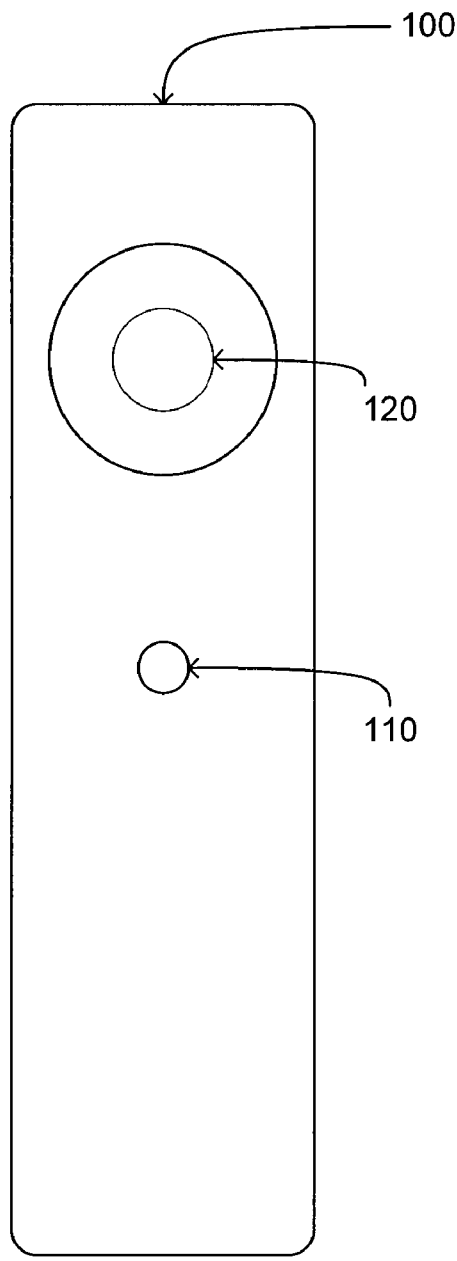
FIGS. 1A and 1B are a front and side view respectively of one embodiment of a camera according to the present invention.
Figure 1B:
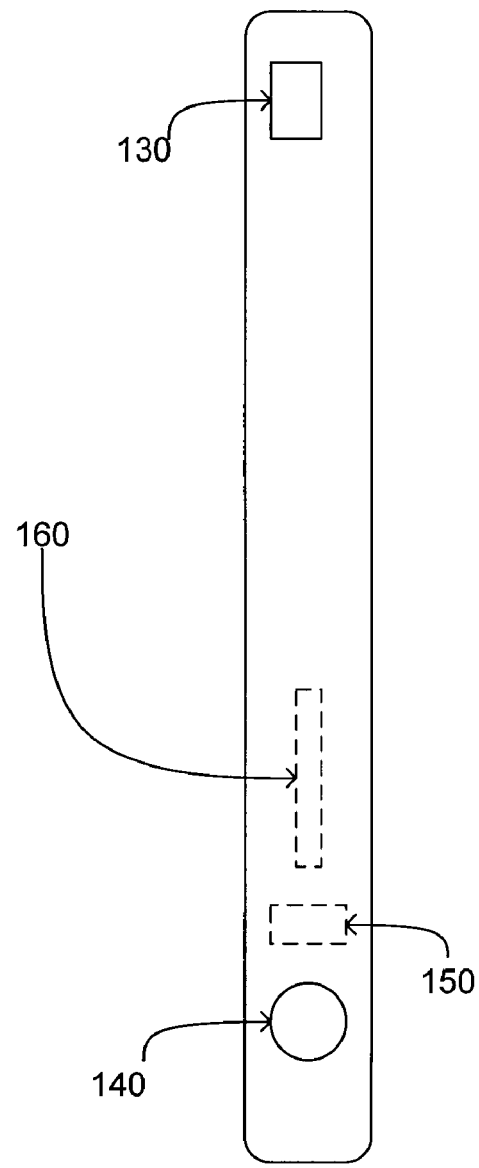

Referring now to FIG. 1A and FIG. 1B, a front and side view, respectively, of an embodiment of a camera 100 incorporating a tilt-sensitive projected viewfinder are shown. The camera 100 includes a projector 110, a lens 120, a communication module 130 and an input button 140. In another embodiment, the camera 100 includes a zoom adjustment 150. In yet another embodiment, the camera 100 defines a slot 160.

The front view of FIG. 1A shows the projector 110 and the lens 120 in a fixed position relative to each other. In one embodiment, the projector 110 and the lens 120 are also adjacent to each other. The lens 120 can be a single lens element, or can be comprised of compound optical elements. The projector 110 projects a visible signal away from the camera 100. The projector 110 can be one or more laser diodes or light emitting diodes (LEDs). In one embodiment, the projector 110 projects a visible signal with an adjustable shape. In an alternative embodiment, the projector 110 includes an etched lens that projects a visible signal with a fixed shape.

FIG. 1B shows a side view of the camera 100. This side view shows the input button 140 positioned on the side of the camera 100. In one embodiment, a slot 160 adapted to receive and couple with a portable media device is located on the side of the camera 100. A portable media device includes a memory card as is typically used in existing digital cameras or portable music players, such as an SD card, CompactFlash card or MD card. In another embodiment, a zoom adjustment 150 is positioned on the side of the camera 100. The zoom adjustment 150 modifies the focal length of lens 120 based on user input. The zoom adjustment 150 can be, for example, a set of buttons, a thumbwheel, a lever, a jog-rocker switch or other device capable of receiving user input. In one embodiment, the zoom adjustment 150 and the input button 140 are adjacent to each other with the slot 160 centrally located on the side of the camera 100. In an alternative embodiment (not shown), the zoom adjustment 150 and the input button 140 are located at opposite ends of the camera 100 with the slot 160 centrally located on the side of the camera 100. These configurations are provided only by way of example, as long as areas for the described functionality are offered, various other configurations are encompassed within the claimed invention.

In another embodiment, a communication module 130 is located partially or completely in the camera 100. The communication module 130 links the camera 100 to a computer system (not shown), or other information processing system. In one embodiment, the communication module 130 is a conventional connection, such as USB, IEEE 1394 or Ethernet, to other systems for distribution of files and information. In another embodiment, the communication module 130 is a conventional type of transceiver, such as for infrared communication, IEEE 802.11a/b/g/n (or WiFi) communication, Bluetooth® communication, 3G communication, IEEE 802.16 (or WiMax) communication, or radio frequency communication. In one embodiment, the communication module 130 is located on the side of the camera 100, but can be located anywhere on the camera 100.

Figure 2:
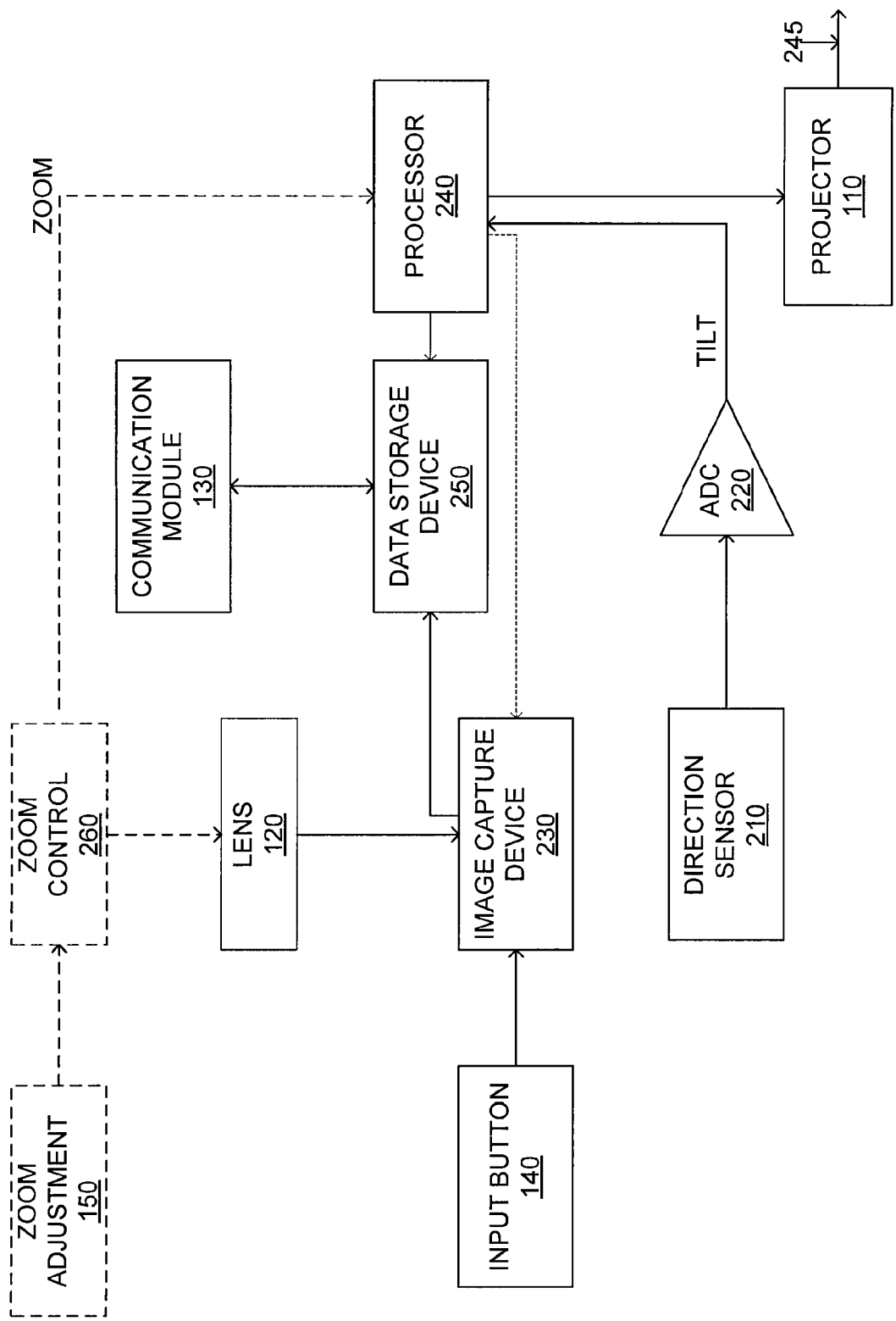
FIG. 2 is a high-level block diagram of one embodiment of the camera in accordance with one embodiment of the present invention.

FIG. 2 is a block diagram of one embodiment of the camera 100 constructed in accordance with the present invention. In addition to the components shown in FIGS. 1A and 1B, the camera 100 also comprises a direction sensor 210, an analog-to-digital converter (ADC) 220, an image capture device 230, a processor 240, and a data storage device 250. In other embodiments, the camera 100 also includes a zoom control 260 and a power supply (not shown).

In one embodiment, the input button 140 provides user input to the image capture device 230. Responsive to user input, image capture device 230 captures an image and generates a signal representing the image that is sent to the data storage device 250. The image capture device 230 converts a visual image into an electric signal. For example, image capture device 230 can be a two-dimensional charge-coupled device (CCD) array, a two-dimensional complementary metal-oxide-semiconductor (CMOS) array, or another device capable of converting a visual image into an electric signal. Other embodiments of the image capture device 230 may use multiple CCD arrays, multiple CMOS arrays, or multiple devices capable of converting a visual image into an electric signal.

The direction sensor 210 determines the orientation of the camera 100. In an embodiment, the direction sensor 210 determines the absolute orientation of the camera 100 by measuring the orientation of the camera 100 in three dimensions. In another embodiment, the direction sensor 210 can be attached to the camera 100. In an alternative embodiment, the direction sensor 210 can be housed within, or partially housed within, the camera 100. The direction sensor 210 can be a magnetometer, accelerometer or any device capable of locally measuring device motion. In yet another embodiment, the direction sensor 210 can be calibrated to determine the orientation of the camera 100 relative to a user-defined reference direction.

In one embodiment, the direction sensor 210 produces an analog signal that indicates the orientation of the camera 100. The analog signal changes in value as the camera orientation changes. To improve the performance of the processor 240, the ADC 220 converts the continuous signal generated by the direction sensor 210 into a discrete or digital signal. The ADC 220 can be implemented in various designs, such as direct conversion, delta-encoded, pipeline or delta-sigma.

The processor 240 processes data signals and may comprise various computing architectures including a complex instruction set computer (CISC) architecture, a reduced instruction set computer (RISC) architecture, or an architecture implementing a combination of instruction sets. Although FIG. 2 only illustrates a single processor 240, multiple processors may be included. The processor 240 comprises an arithmetic logic unit, a microprocessor, or some other information appliance equipped to process received electronic signals and provide electronic signals.

The processor 240 controls the projector 110 to modify a projected visible signal 245 in response to changes in the camera 100 orientation as signaled by the direction sensor 210 and the ADC 220. In one embodiment, the projected visible signal 245 is continuously modified in response to changes in the camera 100 orientation. In an alternative embodiment, the projected visible signal 245 is only modified in response to a user command to adjust the projected visible signal 245. For example, this user command could be provided by a two-trigger switch, such as the input button 140, where the user depressing the button half-way provides a command to modify the projected visible signal 245, and depressing the button completely causes an image to be captured.

The data storage device 250 stores data from the processor 240 and from the image capture device 230. In one embodiment, the data storage device 250 stores image from the image capture device using a standard image format, such as the Joint Photographic Experts Group (JPEG) format, the Tagged Image File Format (TIFF), the Graphic Interchange Format (GIF) or any other format capable of describing image data. The data storage device 250 may be a hard disk drive, a flash memory device, or some other mass storage device known in the art. In one embodiment, the data storage device 250 can be a portable media device which can be removed through slot 160. A portable media device includes a memory card as is typically used in existing digital cameras or portable music players, such as an SD card, CompactFlash card or MD card. The communication module 130 allows other equipment to access the data contained on the data storage device 250.

In an embodiment, the processor 240 associates data from the image capture device 230 with data from the direction sensor 210 indicating the camera 100 orientation. In an alternative embodiment, the image capture device 230 associates data representing a captured image with data from the direction sensor 210 representing the camera 100 orientation. In yet another embodiment, data storage device 250 associates the data from the processor 240 with the data from the image capture device 230 before or at storage. The data from the direction sensor 210 can be embedded as metadata in the data stored from the image capture device 230 in one embodiment.

Data from the direction sensor 210 comprises information describing the orientation of the camera 100, so associating the data from the direction sensor 210 with the data from the image capture device 230 improves subsequent processing of the data from the image capture device 230. For example, data from the direction sensor 210 describes the orientation of the camera 100 when an image was captured by the image capture device 230. Associating the data from the direction sensor 210 with the data from image capture device 230 allows subsequent processing of the captured image data to compensate for the camera 100 orientation when the image data was captured. For example, associating camera 100 orientation with image data indicates whether the image data was captured when the camera 100 was oriented for landscape-type or portrait-type images. The stored orientation data allows different image processing techniques to be applied based on different camera 100 orientations. In an embodiment, the orientation data is included within the captured image data so that the orientation data comprises a portion of the captured image data. For example, the captured image is stored using a format described in the Exchangeable Image File Format (EXIF) specification, the International Press Telecommunications Council (IPTC) specification, the Digital Negative (DNG) specification, or any other format where additional data, such as orientation data, can be encoded within the captured image data.

In another embodiment, the zoom adjustment 150 provides user input to the zoom control 260. The zoom control 260 can mechanically, optically or digitally alter the focal length of lens 120 in response to user input. Alternatively, zoom control 260 may use a combination of mechanical, optical or digital techniques to adjust the focal length of the lens 120. In yet another embodiment, the zoom control 260 digitally modifies the lens 120 focal length, also causing the processor 240 to adjust the image capture device 230. As the zoom control 260 adjusts the focal length of the lens 120, the zoom control 260 transmits a signal to the processor 240. Responsive to user input, the zoom control 260 alters the focal length of lens 120 and transmits a signal to processor 240. Processor 240 processes the signals received from the zoom control 260 and the direction sensor 210 and communicates the resulting signal to projector 110 which modifies the projected visible signal 245.

Figure 3:
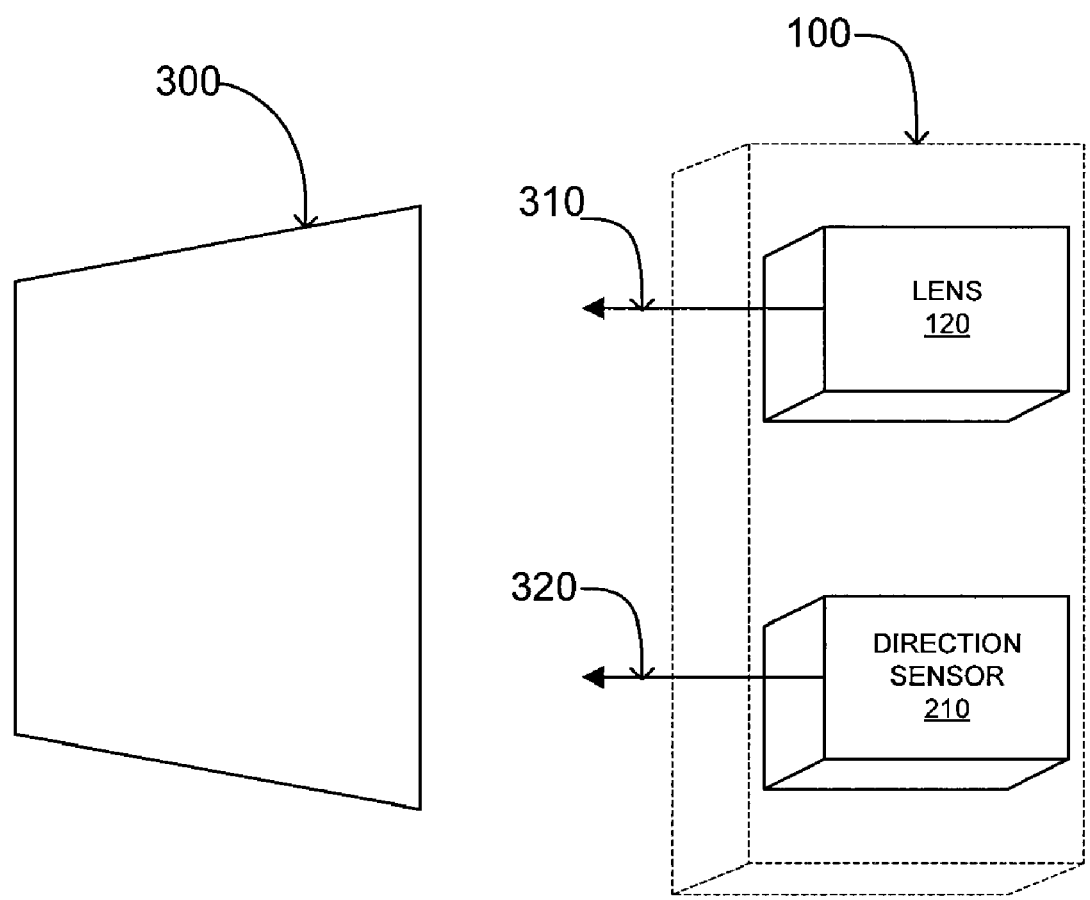
FIG. 3 is an example orientation of a direction sensor and a lens in accordance with one embodiment of the present invention.

FIG. 3 illustrates the relative orientation of the direction sensor 210 and the lens 120 in one embodiment of the invention. For illustration purposes, the direction sensor 210, the lens 120 and an object plane 300 are shown. The object plane 300 contains the object to be imaged.

In one embodiment, the direction sensor 210 and lens 120 are mounted to align one axis 320 of the direction sensor 210 with the optical axis 310 of the camera 100. In this configuration, both the optical axis 310 of the camera 100 and one axis 310 of the direction sensor 210 have the same orientation relative to the object plane 300. Information from the direction sensor 210 can then be used to determine the orientation of the camera 100 optical axis 310 because of the fixed and known relationship between one axis 320 of the direction sensor 210 and the optical axis 310 of the camera 100. As long as there is a fixed relationship between one axis 320 of the direction sensor and the optical axis 310, information from the direction sensor 210 can be used to determine the orientation of the optical axis 310, even if the optical axis 310 and one axis 320 of the direction sensor 210 are not aligned.

In an embodiment, the lens 120 and projector 110 are also parallel to each other making the projector 110 and optical axis 310 parallel. This enables the projected visible signal 245 to illustrate the orientation of the optical axis 310 of the camera 100 relative to the object plane 300.

Figure 4A:
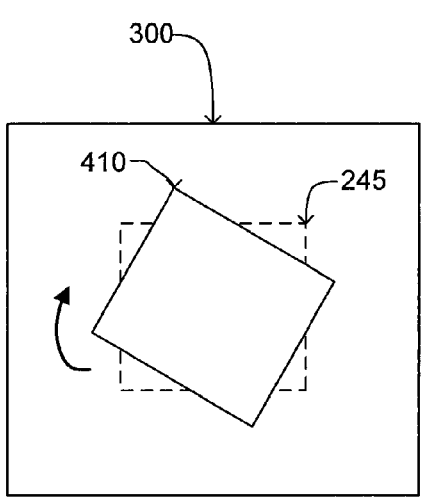
FIGS. 4A and 4B are examples of modifications to the projected visible signal in response to changes in camera orientation in accordance with one embodiment of the present invention.
Figure 4B:
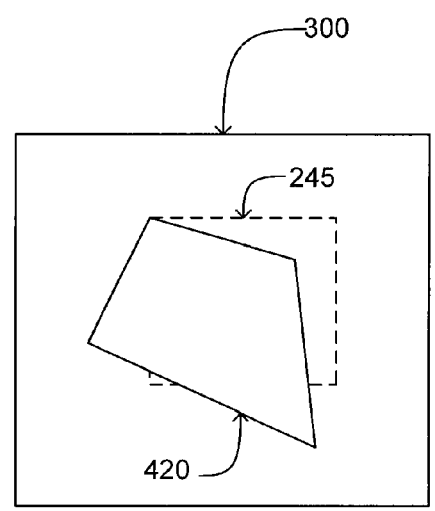

FIGS. 4A and 4B illustrate exemplary modifications to the projected visible signal 245 in response to changes in camera 100 orientation.

FIG. 4A shows an example of modifying the projected visible signal 245 in response to rotation of camera 100 around the optical axis 310. For purposes of illustration, FIG. 4A represents the projected visible signal 245 as a rectangular area. However, the projected visible signal 245 can take any form that indicates an area or portion of the object plane 300 within the field of view of the image capture device 230 such as, for example, a contour, a rectangular grid, a circle or an ellipse.

In one embodiment, the projected visible signal 245 appears as a rectangular area when the optical axis 310 of camera 100 is perpendicular to the object plane 300. Rotating the camera 100 around the optical axis 310 changes the area of the object plane 300 within view of the image capture device 230. The projected visible signal 245 is modified as the field of view of the image capture device 230 changes to indicate the area of the object plane 300 within view of the image capture device 230. Thus, the appearance of the projected visible signal 245 in the object plane 300 is correlated to the rotation of the camera 100 around the optical axis 310.

In the example illustrated in FIG. 4A, rotated visible signal 410 represents a clockwise rotation of projected visible signal 245 caused by clockwise rotation of camera 100 around the optical axis 310. Correlating rotated visible signal 410 with the orientation of camera 100 allows the rotated visible signal 410 to indicate changes in the area within view of the image capture device 230 as camera 100 rotates about the optical axis 310.

FIG. 4B shows an example of modifying the projected visible signal 245 in response to changes in the tilt or pan of the camera 100. As in FIG. 4A, projected visible signal 245 is again represented as a rectangular area, but may take any form able to indicate the area or portion of the object plane 300 in view of the image capture device 230.

In one embodiment, when the optical axis 310 of the camera 100 is perpendicular to the object plane 300, the projected visible signal 245 appears as a rectangular area in the object plane 300. Changing the orientation of the camera 100 by tilting or panning the camera 100 position changes the relative orientation of the optical axis 310 to the object plane 300. The changes in the relative orientation of optical axis 310 and object plane 300 cause distortion of projected visible signal 245 in the object plane 300 responsive to the changes in camera 100 orientation.

In one embodiment, projected visible signal 245 is subject to a keystone distortion when the camera 100 is tilted or panned. Responsive to changes in tilt or pan of the camera 100, the processor 240 applies a keystone transformation to the input to projector 110, modifying the projected visible signal 245 to result in the distorted visible signal 420. In an embodiment, the projected visible signal 245 appears as a rectangular area when the optical axis 310 and object plane 300 are perpendicular; thus, application of a keystone transformation causes the distorted visible signal 420 to appear as a trapezoidal area when the optical axis 310 and object plane 300 are not perpendicular. Observing the distorted visible signal 420 allows a user to approximate the severity of image distortion in different areas within the object plane 300, and to adjust the camera 100 orientation to minimize distortion in certain areas of the object plane 300.

In the example illustrated in FIG. 4B, distorted visible signal 420 represents a change in the camera 100 orientation caused by tilting or panning the camera 100, which changes the relative orientation of the optical axis 310 and the object plane 300. Correlating the appearance of the distorted visible signal 420 with the relative orientation of the optical axis 310 and the object plane 300 allows the distorted visible signal 420 to indicate distortion areas within view of the image capture device 230 distorted by tilting or panning the camera 100.

In another embodiment, projected visible signal 245 is subject to an inverse keystone distortion when the camera 100 is tilted or panned. Responsive to changes in tilt or pan of the camera 100, the processor 240 applies an inverse keystone transformation to the input to projector 110 which compensates for changes in tilt or pan of the camera 100. In such an embodiment, the projected visible signal 245 appears as a rectangular area when the optical axis 310 and object plane 300 are perpendicular; thus, application of the inverse keystone transformation causes the projected visible signal 245 appear rectangular even when the optical axis 310 and object plane 300 are not perpendicular. By applying an inverse keystone transformation to the projector 110 input, the projected visible signal 245 retains its original appearance and is not modified to appear as distorted visible signal 420 despite the movement of the camera, yet is indicated what portion of the scene the capture device will capture.

In another embodiment, changing the camera 100 tilt or pan does not cause the processor 240 to modify the appearance of projected visible signal 245. Although changing the orientation of optical axis 310 alters the output of direction sensor 210, the projected visible signal 245 is not updated in response to the new direction sensor 210 output. Thus, the appearance of projected visible signal 245 is still subject to naturally occurring optical distortion, such as keystone distortion from misalignment of the optical axis 310 and the object plane 300. In one embodiment, the projector 110 comprises a light source and etched lens, preventing modification of the projected visible signal 245 as the camera 100 tilt or pan changes to product distorted visible signal 420. This embodiment requires that the user adjust the position of the camera 100 until the distortion of the projected visible signal 245 is minimized. This embodiment use the projected visible signal 245 as a feed back mechanism to provide the user with an indication of the image that would be captured by the camera 100 for a given position.

Figure 5:
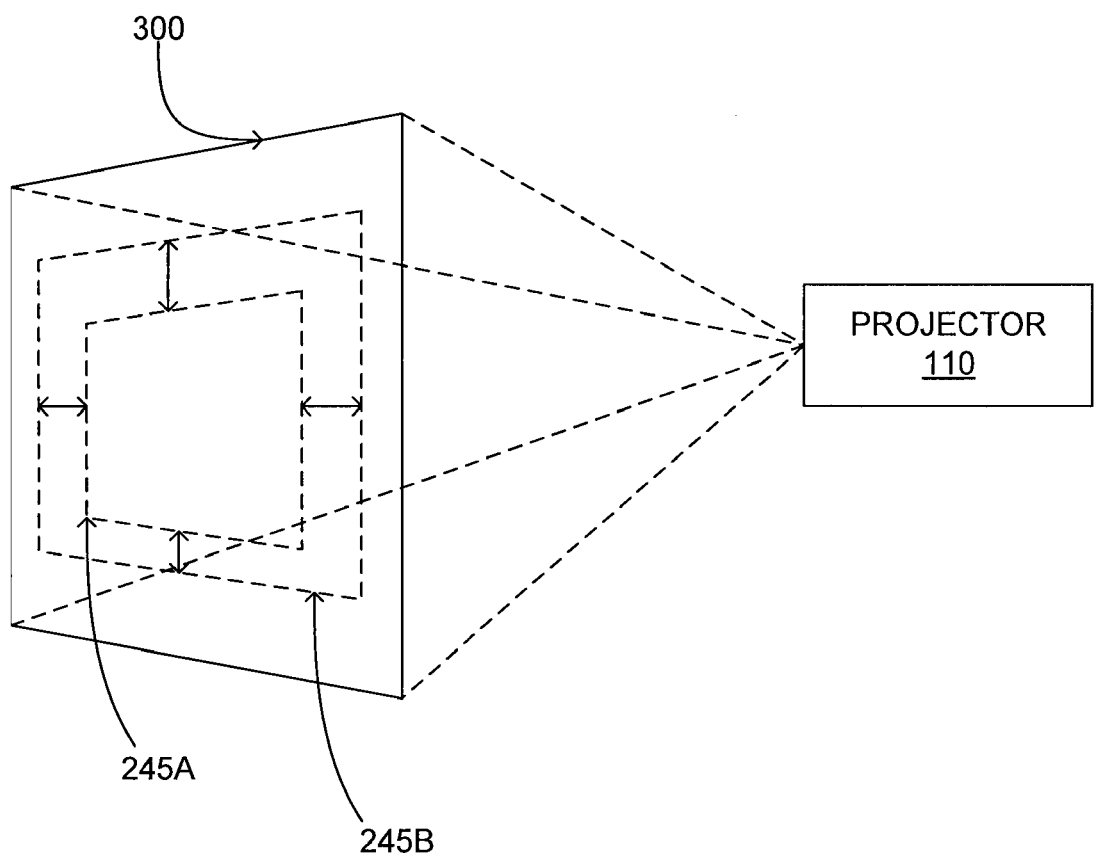
FIG. 5 is an example of a modification to the projected visible signal in response to changes in focal length of a lens in accordance with one embodiment of the present invention.

FIG. 5 shows an example of modifying the projected visible signal 245 in response to changes in the focal length of lens 120. In an embodiment, the zoom control 260 mechanically, optically or digitally alters the focal length of lens 120 responsive to user input from zoom adjustment 150. The zoom control 260 transmits data to the processor 240 describing adjustments to the focal length of lens 120. The processor 240 processes the data describing the changes in the lens 120 focal length and modifies the signal transmitted to projector 110 accordingly. Projector 110 then adjusts projected visible signal 245 in response to the modified signal from processor 240. The projected visible signal 245 then indicates the area of object plane 300 in view of the image capture device 230 after the change in the lens 120 focal length.

For purposes of illustration, FIG. 5 represents the projected visible signal 245 as a rectangular area, but the projected visible signal 245 may take any form able to indicate the area or portion of the object plane 300 within the field of view of the image capture device 230. Processor 240 and projector 110 alter the projected visible signal 245 responsive to changes in the focal length of the lens 120. For example, the projected visible signal 245A indicates the area of object plane 300 in view of the image capture device 230 corresponding to one focal length of the lens 120. Decreasing the focal length of the lens 120 increases the area of object plane 300 in view of the image capture device 230, which is indicated by modifying the projected visible signal 245A to appear as projected visible signal 245B. Similarly, if the focal length of the lens 120 is increased, the area of object plane 300 in view of the image capture device 230 decreases, and the projected visible signal 245B is correspondingly altered to appear as the projected visible signal 245A. In an embodiment, processor 240 produces the projected visible signal 245A and the projected visible signal 245B by changing the input signal to projector 110. In another embodiment, processor 240 produces the projected visible signal 245A and the projected visible signal 245B by adjusting the virtual raster opening angle of projector 110.

In another embodiment, the zoom adjustment 150 also modifies the field of view of the image capture device 230. For example, one setting of the zoom adjustment 150 optimizes the field of view of the image capture device 230 for portrait-type images. A different setting of the zoom adjustment 150 optimizes the field of view of the image capture device 230 for landscape-type images. Changing the field of view of image capture device 230 causes the processor 240 to adjust the shape of the projected visible signal 245 so the projected visible signal 245 indicates the corresponding field of view of the image capture device 230 at the current field of view setting.

Figure 6:
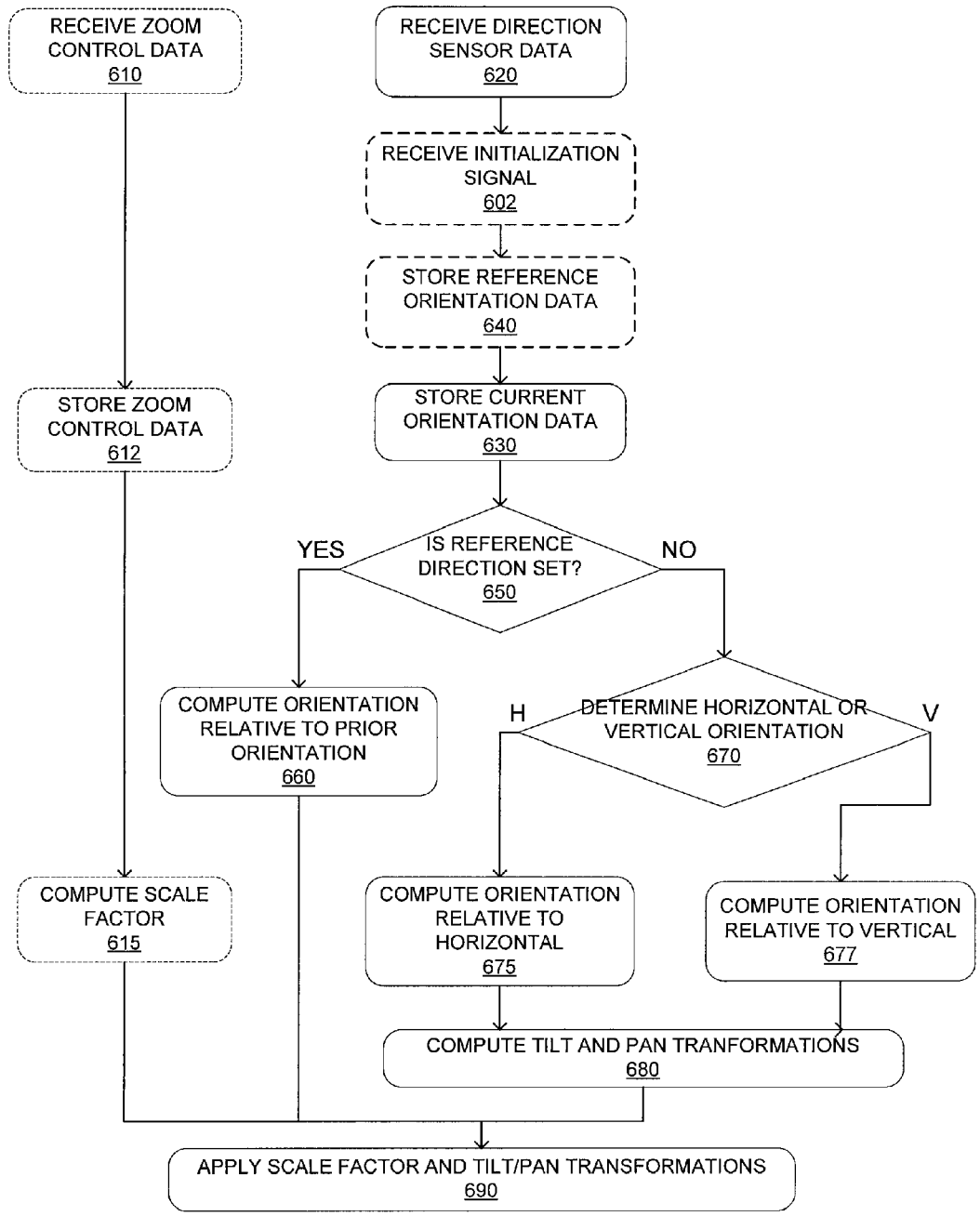
FIG. 6 is a flow chart of an embodiment of a method for modifying the projected visible signal in accordance with the present invention.

FIG. 6 is a flow chart of an embodiment of a method for modifying the projected visible signal 245 in accordance with the present invention. In an embodiment, the steps described in FIG. 6 are implemented by the processor 240.

Processor 240 receives 620 data from the direction sensor 210 representing the orientation of the camera 100. In one embodiment, camera 100 orientation is measured relative to a user-defined reference direction. To specify a reference direction, the processor 240 receives 602 an initialization signal. Receiving 602 the initialization signal causes the processor 240 to store 640 data describing the reference direction. In an embodiment, the stored data describing the reference direction is the data from the direction sensor 210 received by the processor 240 at the time the initialization signal was received 602. If a reference direction has been defined, the direction sensor 210 determines the camera 100 orientation relative to the user-defined reference direction. As the orientation of the camera 100 changes, processor 240 receives new data from direction sensor 210. Processor 240 then stores 630 the revised data representing the new camera orientation.

After storing 630 data for the current orientation, processor 210 determines 650 whether a reference direction was specified. If a reference direction has been stored 640, processor 240 determines the camera 100 orientation relative to the reference direction by determining the differences between the stored 630 data describing the current orientation and the stored 640 data describing the reference orientation. If no reference direction has been stored, the processor 240 determines 670 whether a horizontal reference direction or vertical reference direction is more applicable.

If a horizontal reference is more applicable to the stored 630 current orientation, processor 240 computes 675 the camera 100 orientation relative to a horizontal reference. If a vertical reference is more applicable to the stored 630 current orientation, processor 240 computes 677 the camera 100 orientation relative to a vertical reference. In one embodiment, the processor 240 uses prior measurements of the camera 100 orientation to determine the applicable reference direction. For example, positioning the camera 100 in a predominantly horizontal orientation for a fixed period of time, such as 10 seconds, 15 seconds, or any specified interval, causes the processor 240 to compute 675 the camera 100 orientation relative to a horizontal reference. After calculating the camera 100 orientation, processor 240 computes 680 transformations representing the camera 100 orientation. The computed 680 transformations are then applied 690 to the stored 630 data to produce the projector 110 input.

In another embodiment, the camera 100 comprises a zoom control 260 that adjusts the focal length of lens 120. The processor 240 can use data from the zoom control 260 to modify the visible signal 245 based on changes in lens 120 focal length. The processor 240 receives 610 data from the zoom control 260 representing the focal length of the lens 120. The received 610 zoom control 260 data is then stored 612. The processor 240 then computes 615 a scale factor from the stored 612 the zoom control 260 data. The computed 615 scale factor is then applied 690 to the stored 630 direction sensor 210 data to produce the projector 110 input.

In an alternative embodiment, the processor 240 determines the camera 100 orientation by comparing the current direction sensor 210 data with previous direction sensor 210 data. Upon changing the camera 100 orientation, the stored 630 current orientation data is stored 640 as the reference orientation. This allows the processor 240 to compute the current camera 100 orientation relative to the prior camera 100 orientation, rather than relative to a specified reference direction.

Figure 7:
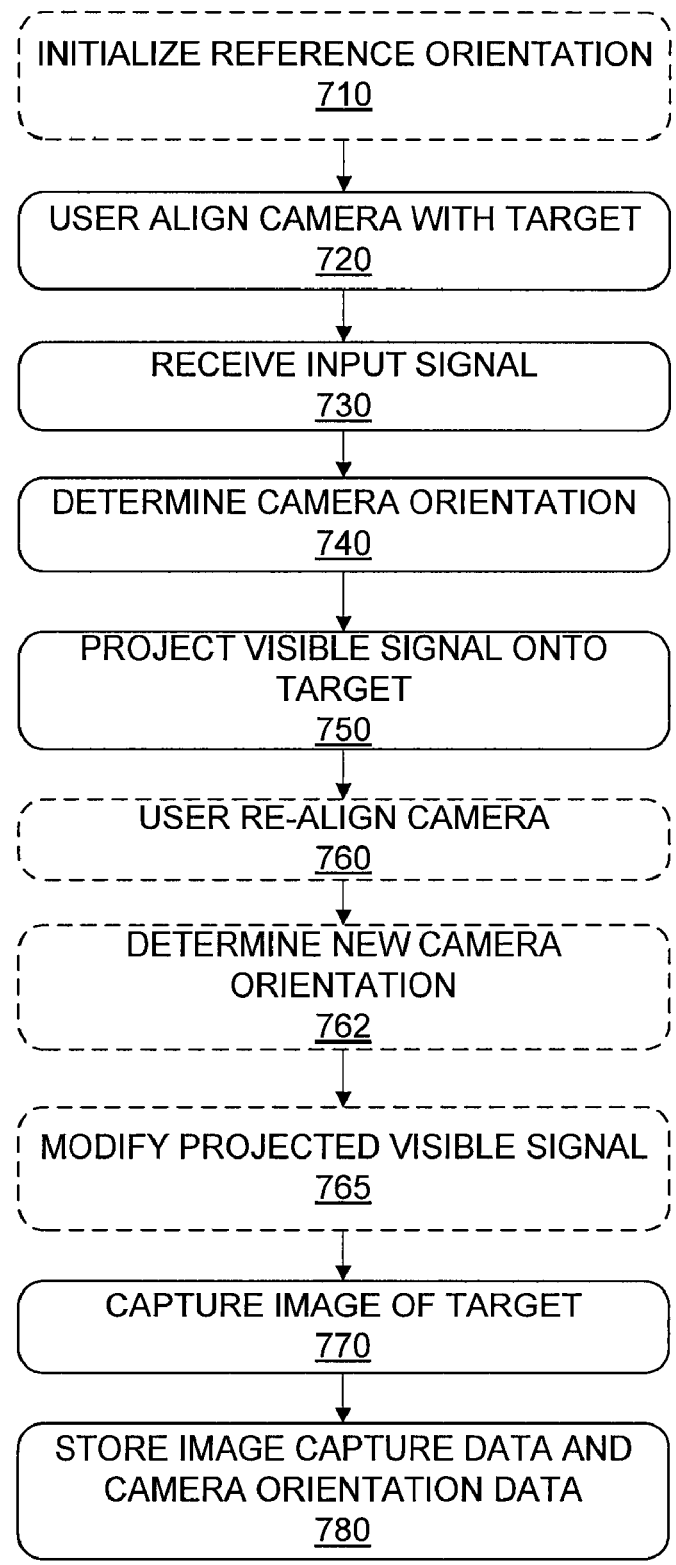
FIG. 7 is a flow chart of an embodiment of a method for capturing images in accordance with the present invention.

FIG. 7 illustrates one embodiment of a method for capturing images with the camera 100 according to the present invention. In one embodiment, a reference direction is initialized 710, and camera orientation is determined relative to the reference direction. The initialized 710 reference direction represents a desired orientation of the optical axis 310 with the object plane 300. In another embodiment, the reference angle is predetermined, removing the need for initialization 710.

A user then aligns 720 the camera 100 with the target, which represents the image to be captured. After the user aligns 720 the camera 100 with the target, the camera receives 730 an input signal from the user. Receiving 730 the input signal causes the direction sensor 210 to determine 740 determination 740 the camera 100 orientation. In another embodiment, the camera 100 orientation is continuously determined 740 even without receiving 730 an input signal from the user.

After determining 740 the camera 100 orientation, a visible signal is projected 750 onto the target indicating the portion of the target within the field of view of the image capture device 230. If necessary, a user can use the projected visible signal 245 to re-align 760 the camera 100 so the desired portion of the target is within view of the image capture device 230. User re-alignment 760 of the camera 100 changes the relative orientation of the optical axis 310 and the object plane 300, so the camera 100 orientation associated with the re-aligned 760 orientation is determined 762. The projected visible signal 245 is then modified 765 to indicate the orientation of the re-aligned 760 camera 100.

When the camera 100 is appropriately aligned with the target, an image of the target can be captured 770 by activating the image capture device 230. Data representing the captured 770 image of the target and data representing the camera orientation are then stored 780 in the storage device 250.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. An apparatus comprising:
 an image capture device;
 a direction sensor to determine an orientation of the image capture device; and
 a projector adapted to communicate with the direction sensor, the projector to project a visible signal with an adjustable shape to indicate a field of view of the image capture device, wherein the adjustable shape is modified responsive to variations in the orientation of the image capture device.

2. The apparatus of claim 1, further comprising a lens to image an object plane onto the image capture device.

3. The apparatus of claim 2, further comprising a mechanism to modify a focal length of the lens.

4. The apparatus of claim 3, wherein the adjustable shape is modified responsive to modifying the focal length of the lens.

5. The apparatus of claim 1, wherein the direction sensor is partially housed within the apparatus.

6. The apparatus of claim 1, wherein the direction sensor is housed within the apparatus.

7. The apparatus of claim 1, further comprising a storage device to store a data describing the field of view of the image capture device and describing the orientation of the apparatus.

8. The apparatus of claim 1, further comprising a mechanism to modify the field of view of the image capture device, wherein the adjustable shape is modified in response to modifying the field of view of the image capture device.

9. A method for capturing an image with an apparatus, the method comprising:
   determining an orientation of the apparatus;
   projecting a visible signal with an adjustable shape onto a target, the adjustable shape indicating an area of the target within view of the apparatus;
   modifying the adjustable shape responsive to variations in the orientation of the image capture device; and
   capturing an image of the target.

10. The method of claim 9, further comprising storing a first data representing the captured image of the target and a second data representing the orientation of the apparatus.

11. The method of claim 9, wherein determining the orientation of the apparatus comprises calculating a difference between a reference orientation of the apparatus and a current orientation of the apparatus.

12. The method of claim 9, further comprising modifying the adjustable shape in response to changes in the orientation of the apparatus.

* * * * *